United States Patent [19]

Kujawa et al.

[11] Patent Number: 5,731,564
[45] Date of Patent: Mar. 24, 1998

[54] METHOD OF OPERATING A CENTRIFUGAL PLASMA ARC FURNACE

[75] Inventors: Stephan T. Kujawa; Daniel M. Battleson; Edward L. Rademacher, Jr.; Patrick V. Cashell; Krag D. Filius, all of Butte; Philip A. Flannery, Ramsey; Clarence G. Whitworth, Butte, all of Mont.

[73] Assignee: MSE, Inc., Butte, Mont.

[21] Appl. No.: 596,682

[22] Filed: Feb. 5, 1996

[51] Int. Cl.⁶ .................. B23K 10/00; F23B 5/00
[52] U.S. Cl. .................. 219/121.36; 219/121.37; 219/121.38; 219/121.59; 588/252; 588/256; 373/20; 75/333; 75/362; 110/346; 110/246
[58] Field of Search .................. 219/121.43, 121.44, 219/121.37, 121.38, 121.59, 121.53; 75/10.19, 10.22, 333, 362, 363, 414; 588/900, 252, 256, 227; 373/18–22; 110/242–256, 356; 423/5

[56] References Cited

U.S. PATENT DOCUMENTS

| | | | |
|---|---|---|---|
| 3,783,167 | 1/1974 | Tylko | 13/1 |
| 4,602,574 | 7/1986 | Bach et al. | 110/346 |
| 4,950,309 | 8/1990 | Schulz | 48/197 R |
| 5,180,421 | 1/1993 | Rostoker et al. | 75/414 |
| 5,358,549 | 10/1994 | Nagel et al. | 75/414 |
| 5,364,447 | 11/1994 | Philipp et al. | 75/500 |
| 5,370,066 | 12/1994 | Workman et al. | 110/346 |
| 5,421,857 | 6/1995 | Marteanenko et al. | 75/707 |
| 5,496,392 | 3/1996 | Sims et al. | 75/414 |

*Primary Examiner*—Mark H. Paschall
*Attorney, Agent, or Firm*—Peter Tribulski

[57] ABSTRACT

A centrifugal plasma arc furnace is used to vitrify contaminated soils and other waste materials. An assessment of the characteristics of the waste is performed prior to introducing the waste into the furnace. Based on the assessment, a predetermined amount of iron is added to each batch of waste. The waste is melted in an oxidizing atmosphere into a slag. The added iron is oxidized into $Fe_3O_4$. Time of exposure to oxygen is controlled so that the iron does not oxidize into $Fe_2O_3$. Slag in the furnace remains relatively non-viscous and consequently it pours out of the furnace readily. Cooled and solidified slag produced by the furnace is very resistant to groundwater leaching. The slag can be safely buried in the earth without fear of contaminating groundwater.

11 Claims, 3 Drawing Sheets

METHOD OF OPERATING A CENTRIFUGAL PLASMA ARC FURNACE

CONTRACTUAL ORIGIN OF THE INVENTION

This invention was made with United States Government support under Contract No. DE-AC22-88ID12735 awarded by the Department of Energy. The Government has certain rights in this invention.

FIELD OF THE INVENTION

The invention relates to treating industrial wastes.

BACKGROUND OF THE INVENTION

Throughout the industrialized world there are deposits of contaminated soil which pose a hazard. Ground water which enters these contaminated soils can dissolve and carry some of the contaminants into drinking water supplies. The contaminants include such materials as harmful organic compounds and soluble heavy metals. In some cases the soils are contaminated with radioactive wastes.

In some serious cases, contaminated soils are removed and treated in furnaces to produce vitrified masses of material. When contaminated soil is vitrified, its density is increased and its volume is reduced. Additionally, organic compounds are typically pyrolized and rendered harmless. When a mass of contaminated soil is vitrified, it can be safely buried in the earth because any heavy metal components of the soil are made substantially unleachable in ground water.

In addition to contaminated soils, there are other hazardous objects which require safe disposal. For, example obsolete military devices such as fuses and chemical warfare apparatus need to be destroyed in a cost-effective way. In many of these cases, for purposes of maintaining secrecy, there is a need to obliterate any discernible features or characteristics of the devices. Disposal of such devices in a vitrified soil medium has been found to be technically and economically viable.

Centrifugal plasma arc furnaces have been employed with some limited success to perform these disposal tasks. One such furnace is described in U.S. Pat. No. 5,136,137 (M. P. Schlienger), issued Aug. 4, 1992. In principle, this furnace is operated in a semi-batch mode. Materials to be treated are fed into a refractory lined rotatable chamber. A plasma arc torch heats the material in the chamber as it rotates. The material melts and forms a slag. Material is continually fed into the chamber until a predetermined mass of material is in a molten form. The chamber is then stopped and the slag is poured out of the chamber into a container. After the chamber is emptied, the process of introducing material and melting with the plasma arc torch is repeated.

The principle of operation of a centrifugal plasma arc furnace is well-described in the above identified U.S. Patent and various other patents which have issued from related applications. These patents however do not describe a practical method for operating the centrifugal plasma arc furnace to achieve a cost-effective waste disposal system.

We have found that the furnace suffers from various shortcomings which have heretofore precluded its economic application to real-life disposal problems. For example, we have observed that the furnace can not be operated successfully be simply introducing waste materials of any variety into the rotating chamber. In many cases, the waste materials form a molten slag which is too highly viscous. Highly viscous molten slags typically will not pour out of the chamber. This problem is particularly acute when stainless steel objects are part of the waste materials. When the chamber cannot be easily emptied, the furnace cannot operate as a high productivity commercial unit but is instead relegated to operation as a laboratory experimental device.

It is desirable therefore to provide a method that will facilitate the use of a centrifugal plasma arc furnace to process large quantities of contaminated materials in a cost-effective and efficient manner.

SUMMARY OF THE INVENTION

The present invention is directed to a method of operating a centrifugal plasma arc furnace in a manner that produces a low viscosity oxidized slag that can be readily discharged from the furnace. The slag, when cooled and solidified must be leach-resistant. The achievement of desired slag characteristics is attained by adding iron to the slag and oxidizing the iron to magnetite.

Viewed from one aspect, the present invention is directed to a method for operating a centrifugal plasma arc furnace. The method comprises the steps of adding iron to a charge of waste material being treated in the furnace. The charge of waste material is exposed to an oxidizing atmosphere while the waste material is molten slag. The time of exposure to the oxidizing atmosphere is controlled to produce iron oxides in the slag, which iron oxides are predominantly in an $Fe_3O_4$ state.

Viewed from another aspect, the invention is directed to a method for treating wastes in a rotatable plasma arc furnace. The method comprises the step of introducing iron into the waste so that the ratio of the mass of iron to the mass of the waste in the furnace is at least about 20% of the non-volatile, non-combustible components of the waste.

Viewed from still another aspect, the invention is directed to a method of treating stainless steel bearing wastes in a plasma arc furnace. The method comprises the steps of introducing a matrix former into the furnace so that the matrix former comprises at least 40% of the mass of the waste in the furnace and introducing iron or carbon steel into the furnace so that the mass of iron or carbon steel is at least equal to the mass of the stainless steel.

The invention will be better understood from the following detailed description taken in consideration with the accompanying drawings and claims.

The drawings are not necessarily to scale.

DETAILED DESCRIPTION

Figure 1:
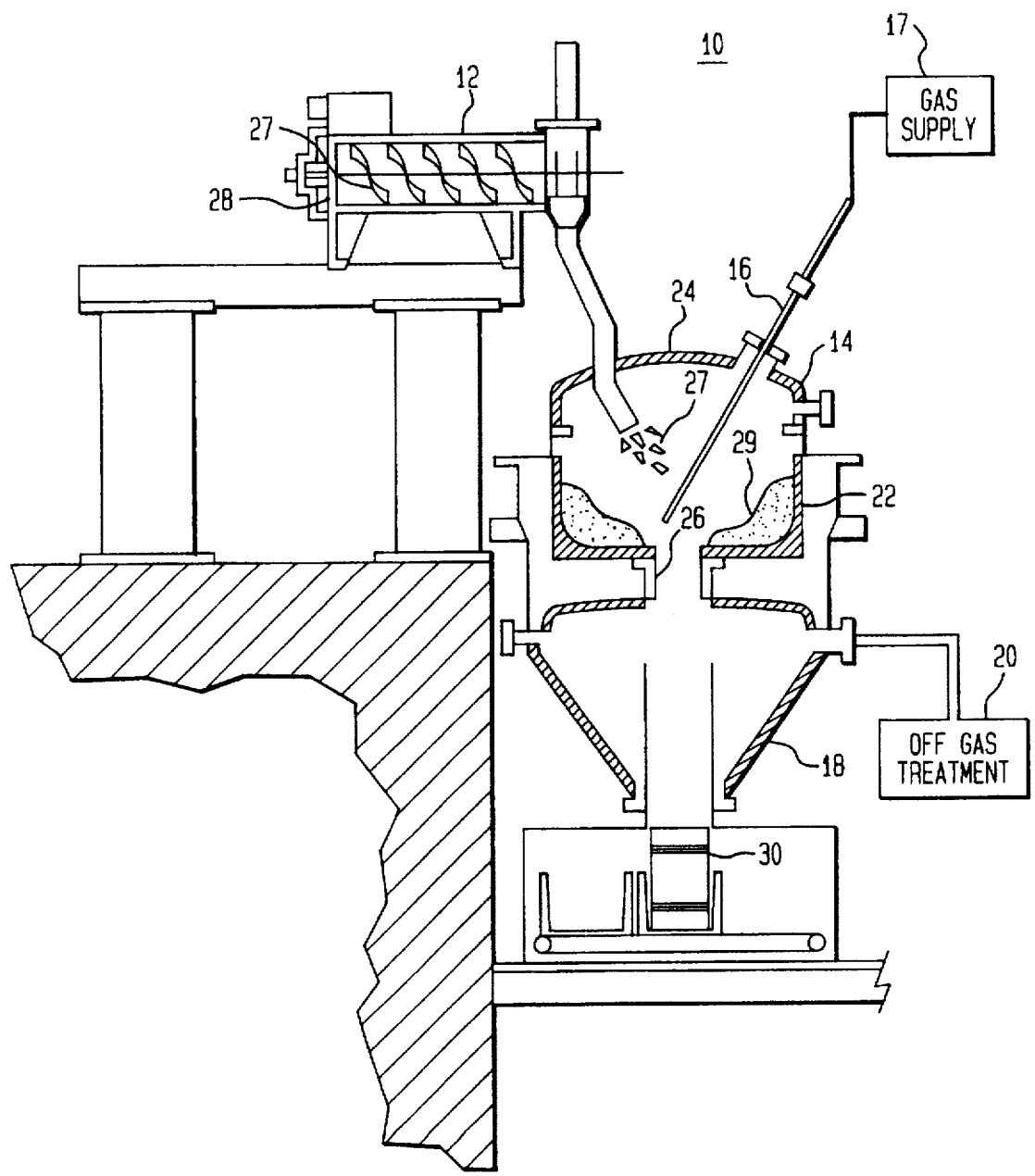
FIG. 1 shows, symbolically, a centrifugal plasma arc furnace in which the present inventive method has utility.

Referring now to FIG. 1, there is shown a centrifugal plasma arc furnace 10 adapted to vitrify waste materials. The furnace 10 comprises a wastefeeder 12, a reactor vessel 14, a plasma torch 16, a gas supply 17, an afterburner 18, an offgas treatment unit 20. The reactor vessel 14 comprises a rotatable chamber 22, an upper hinged lid 24 and a throat 26.

In general terms, operation of the centrifugal plasma arc furnace 10 can be described in the following way. Waste material 27 is fed into an input end 28 of the wastefeeder 12. The wastefeeder 12 meters the waste material 27 into the reactor vessel 14. The plasma arc torch 16 provides sufficient heat to melt the waste material 27 into a molten slag 29 as it is metered into the reactor vessel 14. The rotatable chamber 22 is maintained in a rotational state while the waste material 27 is metered into the reactor vessel 14. The rotation of the chamber 22 produces centrifugal forces on the molten slag 29. These centrifugal forces keep the molten slag 29 near outer surfaces of the rotatable chamber 22 and away from the throat 26.

After a predetermined amount of waste material 27 has been metered into the reactor vessel 14 and melted, the rotatable chamber 22 is slowed or stopped. The molten slag 29 is released from centrifugal forces. The slag then flows out of the reactor vessel 14 through the throat 26 and drops into a removable waste container 30. The waste container 30 along with its contents is then removed from the furnace 10. When the slag 29 cools it becomes a solid leach resistant matrix.

A more detailed description of the furnace 10 can be had by referring to U. S. Pat. No. 5,136,137 (M. P. Schlienger), issued Aug. 4, 1992 which is incorporated herein by reference.

While some of the well known general operating principles for the furnace 10 have been described hereinabove, there are various inventive methods of operation which have not heretofore been known or disclosed. These novel methods of operation of the furnace 10 are the subject matter of the present invention.

In order to appreciate the significance of these novel methods of operation, one must understand a dilemma which arises during operation of the furnace 10. The furnace 10 is intended to be useful in melting virtually any type of waste product including metals and contaminated soils. Many waste products of this type include organic contaminants such as oils and chlorinated hydrocarbons. To assure that these organic contaminants are rendered harmless, it is necessary to operate the reactor vessel 14 with an oxidizing atmosphere.

Additionally, it has been found that a partial pressure of oxygen in the chamber 22 tends to preclude formation of metallic chlorides from metallic components of the waste materials being treated. Metallic chlorides are relatively volatile substances at the elevated temperatures at which the centifugal arc furnace 10 operates. Thus if metallic components of the waste were permitted to form chlorides, there would be an increased risk that the chlorides would volatilize and become part of the stream of off-gasses. This would result in a reduction of the amount of metals which would ultimately get bound into the most desirable form of the waste material, a leach resistant matrix.

The oxidizing atmosphere produces harmless oxides of the organic contaminants and precludes formation of metallic chlorides. But, at the same time, the oxidizing atmosphere creates oxides of metals which are contained in the waste material. These metallic oxides typically have extremely high melting temperatures. The melting temperature of many metallic oxides exceeds a practical limit of operating temperature of the furnace 10.

This practical operating temperature limit is determined by a number of factors. First, there is a consideration of throughput of the furnace 10. Higher temperatures require higher energy inputs and longer periods of time for batches of waste to be heated. Secondly, higher temperature results in volatilization of some of the heavy metal components in the waste. If heavy metals volatilize, they become part of the off-gas stream instead of part of the leach resistant matrix. Thirdly, excessive temperatures result in damage to various components and ancillary equipment of the furnace 10. Taking these points into consideration, the practical molten pool operating temperature limit of the furnace 10 has been found to be approximately 1650° C.

In view of this temperature limit, the following operating difficulty is present: How does one create a molten mass of waste material that contains high melting point oxides without exceeding the practical operating temperature limit of the furnace 10?

The solution to this operating difficulty lies in assuring that the waste material in the reactor vessel 14 attains a low viscosity molten state at temperatures below the practical operating temperature limit. This is accomplished, in accordance with the present invention, by controlling the composition of the molten waste or slag.

In accordance with the present invention, an initial assessment of the characteristics of waste material is performed prior to loading the waste into the furnace 10. Various materials are then selected to be added to the waste material as it is treated in the furnace. The function of these additives is to attain a molten mixture in the furnace 10 which can meet a requisite set of characteristics for high productivity operation of the furnace 10.

The molten waste material or slag 29 in the furnace 10 must tolerate exposure to an oxidizing atmosphere for a period of time long enough to render harmless any organic contaminants in the waste. The slag 29 must remain molten at a temperature lower than the practical operating temperature limit of the furnace 10. Also, the slag 29 must retain a low viscosity after exposure to the oxidizing atmosphere. The viscosity must be low enough to permit the slag 29 to readily flow out of the rotatable chamber 22 through the throat 26 when the chamber 22 is slowed or stopped.

In prior art applications of the centrifugal plasma arc furnace 10, there have been instances in which the slag 29 has become highly viscous and would not readily flow out through the throat 26 when the rotatable chamber 22 was stopped. Indeed, it was observed that a typical batch of high silica soil mixed with organic contaminants such as chlorinated hydrocarbons would form a putty-like mass in the rotatable chamber 22 when melting was performed in an oxidizing atmosphere. When slag formed into a putty-like mass, the furnace 10 could not continue its repetitive batch operation. It became necessary to stop the furnace 10, to allow it to cool, and then after cooling, to chip the vitrified slag 29 out of the rotatable chamber 22. Clearly, this type of discontinuous operation does not provide a cost-effective waste treatment system.

In the prior art, avoidance of a high viscosity slag was achieved by using a conventional flux. Typically, sodium carbonate was added to the waste material during melting. The addition of sodium carbonate produced a less viscous molten mass which could be readily poured from the furnace 10. However, this technique for reducing viscosity often produces an intolerable side-effect. The added sodium produces a vitrified mass which is too soluble in ground water. The resultant vitrified mass of waste material with sodium carbonate is not sufficiently leach-resistant to meet the standards of a Toxicity Characteristic Leaching Procedure (TCLP) an EPA promulgated test for RCRA wastes.

Use of prior art fluxes such as sodium carbonate also produce an operating difficulty in the furnace 10. When sodium carbonate is present in the slag 29, the melting temperature of the slag is reduced to a very low level, less than about 1400° C. With the slag 29 at this low temperature, it becomes impractical to introduce solid metallic waste into the furnace 10. It has been found that metallic objects sink to the bottom of the chamber 22 when introduced into such a low temperature slag. The metallic objects do not melt quickly since the temperature of the mixture is below the melting temperature of the metal. Consequently, the metal falls to the bottom of the chamber 22 in solid form. When a solid metal object gets into contact with the bottom of the water cooled wall of the chamber 22, the metal object develops a heat transfer relationship with the reactor wall. The metallic waste object is thus kept in a cooled state and will not melt into the slag 29. This results in two problems. First of all, the solidified metal remains within the reactor volume when the molten slag 29 is discharged. This reduces the volume available for processing subsequent batches of waste thus reducing throughput rates. Secondly, the molten slag 29 which is discharged solidifies into a predominantly silicate matrix. This produces an undesirable effect on leachability.

In accordance with the present invention, we have found that controlled addition of iron into a molten mass of contaminated high silica soil produces a desirable and beneficial effect. It produces and maintains a low viscosity in a resulting slag while yielding a very leach resistant vitrified product. Iron is added and melting and oxidation are performed in a manner that produces a dispersion of iron oxide in form of magnetite or $Fe_3O_4$ in the slag. If the process is not carried out correctly, the iron oxidizes into the $Fe_2O_3$ state, and the molten mass becomes highly viscous or putty-like. Thus, addition of iron when performed improperly produces counterproductive results. However, the addition of iron with appropriate controls produces a low viscosity slag which is readily poured out of the furnace 10. Additionally, after cooling, the vitrified mass of waste material with the added iron is highly resistant to ground water leaching. Testing has shown that such masses of material are fully capable of meeting the rigorous TCLP standards.

The presence of magnetite appears to provide an opportunity for crystal formation during cooling of the slag. Material which is solidified from a slag with dissolved magnetite, tends to develop into a rock-like and highly insoluble structure. Material which is solidified from a slag without magnetite tends to form into a glassy configuration. The glassy formation has been found to be substantially more soluble in ground water than the rock-like formation.

A series of tests has shown that an optimizing effect on leach resistance of treated wastes can be attributed to a particular ratio of $Fe^{2+}/Fe^{3+}$ in the final waste product. An optimum ratio of $Fe^{2+}/Fe^{3+}$ of about 0.5, a ratio equal to that of magnetite has been found to produce solid wastes with very high leach resistance. This desirable ratio can be attained only if sufficient iron is in the slag and only if the slag is exposed to an oxidizing atmosphere for a proper length of time.

Various examples of concentrations of iron and oxidation times are described later hereinbelow. Additionally, the relationship of $Fe^{2+}/Fe^{3+}$ ratio and leachability are discussed in a paper entitled "Durability of Vitrified Ceramic Waste Forms Produced From Simulated Low Level Wastes Using a Plasma Centrifugal Furnace", C. G. Whitworth and K. D. Filius, presented at American Ceramic Society 1995 International Meeting, Cincinnati, Ohio in May, 1995, which is incorporated herein by reference.

These experiments have shown that controlled addition of iron into the waste material produces a desirably leach resistant final product. But, the addition of iron with controlled oxidation also permits a desirably efficient mode of operation of the centrifugal plasma arc furnace 10.

These beneficial operating results from the addition of iron are very much unexpected. A staightforward analysis of expected results would lead one to conclude that adding iron to a molten soil mixture in an oxidizing atmosphere would produce $Fe_2O_3$, an iron oxide with a very high melting temperature. Thus the addition of iron would be contraindicated to a person with ordinary skill in this field.

A key to success of the present invention is in allowing oxidation of the iron to proceed only to the magnetite or $Fe_3O_4$ state. The presence of magnetite in the molten mixture actually reduces its viscosity.

The effect of iron oxide on the viscosity of slags appears to be governed by the principle that $Fe^{++}$ ions have a relatively low attraction for silicate anions in a slag mixture. Ironically, this principle was discovered in research work which was directed to finding techniques which would prevent slags from foaming during metal smelting operations. It was believed that slag foaming would be reduced if slag viscosities were not permitted to become low.

Various experiments were conducted and reported in "Viscosities in Silicate Slag Systems"—Patricia M. Bill, *Journal of The Iron and Steel Institute*, February 1963, pp. 133–140. In these experiments it was demonstrated that increased concentrations of $Fe^{++}$ ions in a silicate slag mixture would have the adverse effect (for purposes of smelting) of decreasing viscosity.

We, the inventors, have applied this principle in a completely contrarian manner to the operation of the centrifugal arc furnace 10. A high concentration of $Fe^{++}$ ions is used advantageously in our system to produce low viscosity and to achieve ease of operation of the furnace 10.

A particularly good example of the utility of the present invention involves the disposal of wastes containing high chromium stainless steel. In some instances articles of stainless steel are contained in contaminated soil. In other instances, articles of stainless steel may be radioactively contaminated. In either case it is desirable to treat the stainless steel in the centrifugal plasma arc furnace 10 to produce a leach resistant vitrified mass in which the components of the stainless steel are captured.

When stainless steel is melted and exposed to an oxidizing atmosphere in the furnace 10, formation of chromium oxide occurs. Chromium oxide has a very high melting temperature and its presence in prior art slags produced in the furnace 10 resulted in putty-like masses forming in the furnace 10. These putty-like masses would not flow out of the furnace 10. Consequently, the furnace 10 needed to be cooled and the cooled mass of chromium oxide bearing slag needed to be removed by chipping and breaking the slag into small pieces.

We have found that a high concentration of $Fe_3O_4$, and its associated $Fe^{++}$ ions, is particularly advantageous when stainless steel is part of the waste material being processed in the furnace 10. This is a matter of no small consequence in processing radioactive wastes. In many sites where radioactive wastes are present, there are many stainless steel articles co-mingled with the waste materials.

In the prior art, centrifugal arc furnaces have not been capable of processing wastes which contained any significant amount of stainless steel. The reasons for these difficulties have not heretofore been understood. Our development work and analysis not only disclosed the reason for the difficulty, it also provided a practical scheme for overcoming the difficulty.

Figure 2:
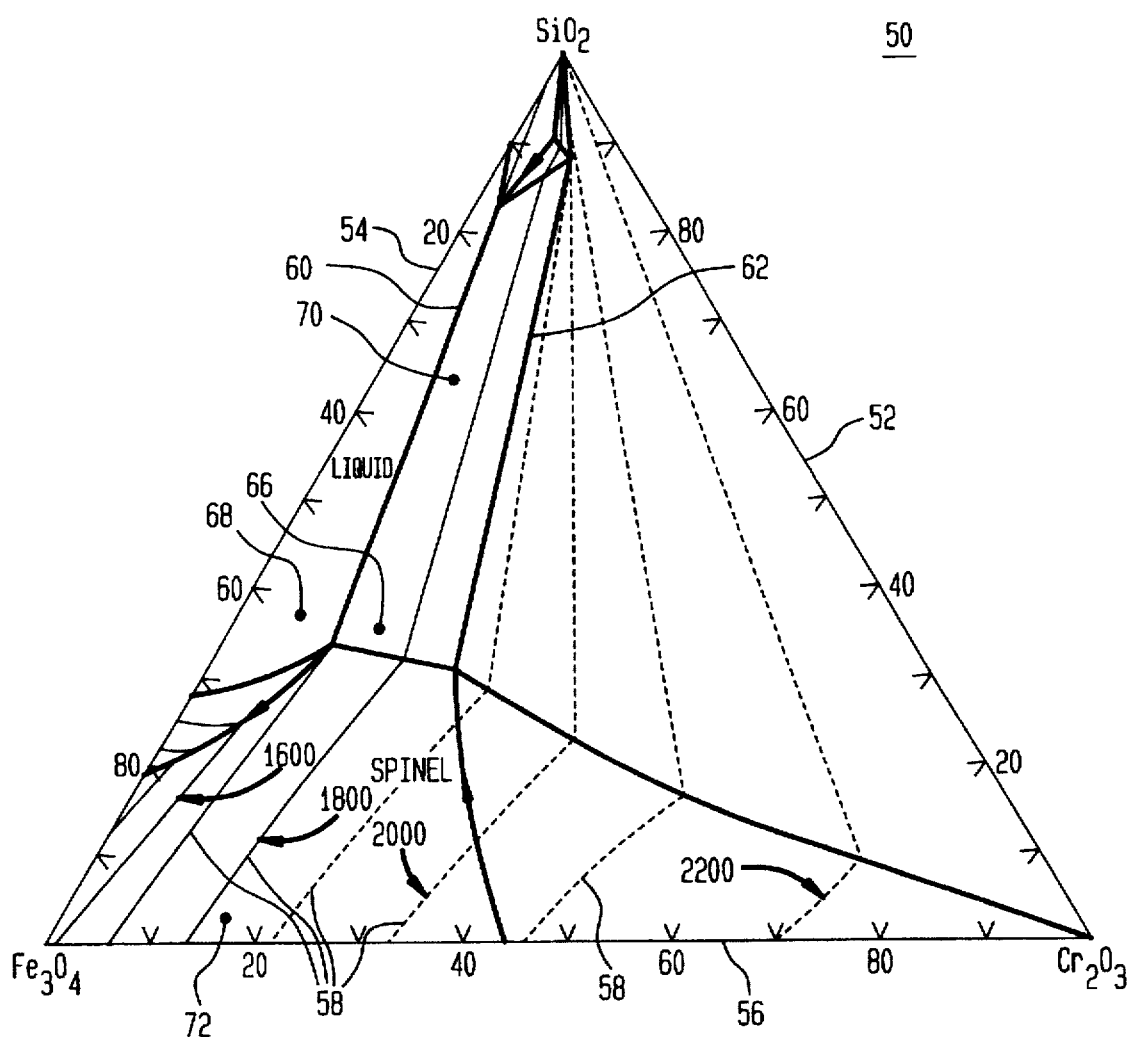
FIG. 2 is a phase diagram on which various prior art mixtures are plotted to illustrate a comparison with mixtures produced in accordance with the present invention.

Referring now to FIG. 2 there is shown a triangular phase diagram 50 for a mixture $SiO_2$, $Fe_3O_4$ and $Cr_2O_3$. The phase diagram 50 shows a percentage of each component of the mixture along each of its three sides. Along a line 52 a percentage of $SiO_2$ is shown. Along a line 54 a percentage of $Fe_3O_4$ is shown. Along line 56 a percentage of $Cr_2O_3$ is shown. Another series of lines 58 show a series of isotherms of various temperatures. A second series of isotherm lines 60 and 62 show boundaries between various characteristics of the mixtures.

There are four mixtures plotted illustratively on the diagram 50 at points 66, 68, 70 and 72.

A first mixture is plotted at a point 66. This is a mixture that results from placing equal weights of sand and 18-8 stainless steel into the furnace 10. It comprises 36% $SiO_2$, 50% $Fe_3O_4$ and 14% $Cr_2O_3$.

It can be seen that this particular combination does not become molten until its temperature is raised to nearly 1800° C. Additionally, it can be seen that even after that temperature is attained the mixture is still within a region of the diagram wherein spinel formation occurs.

This positioning on the phase diagram 50 illustrates two difficulties in the disposal of stainless steel.

First of all a temperature of over 1800° C. is beyond the practical operating limits of the furnace 10. If the furnace 10 were operated at this temperature, there would be excessive cooling needed to avoid damage to its ancillary elements.

A second difficulty can be seen when one recognizes that the mixture represented by the point 66 is in the spinel region of the phase diagram 50. This means that there is a very high probability that spinel crystals will develop in the mixture. These crystals contribute to a substantial increase in the viscosity of the mixture. As has been discussed previously, when the slag has a high viscosity, it is difficult if not impossible to operate the furnace 10 efficiently.

If we turn our attention to the point 68, however, we can see that this point represents a liquidus temperature close to 1600° C. The point 68 is a plot of a mixture that results from combining two parts by weight of sand, one part by weight of 1808 stainless steel and one part by weight of iron or carbon steel. This results in a mixture that comprises 36% $SiO_2$, 50% $Fe_3O_4$ and 14% $Cr_2O_3$. This mixture is outside the spinel region of the diagram of FIG. 2. Thus it is completely liquid and has a low viscosity. The liquid phase is attained at a temperature of about 1600° C. which is a temperature well within the practical operating parameters of the furnace 10.

It is interesting to note that these desirable results cannot be attained simply by increasing the ratio of sand in a mixture of stainless steel and sand. For example, if one were to make a mixture of three parts by weight of sand and one part by weight of stainless steel, the resulting slag would be comprised of 62% $SiO_2$, 29% $Fe_3O_4$ and 8% $Cr_2O_3$. Referring still to FIG. 2, this particular mixture is shown at a point 70. It can be seen that the point 70 remains in the spinel region and has a liquidus temperature of about 1800° C. It is clear therefore that presence of additional $Fe_3O_4$ in the mixture is needed to achieve a fully melted slag without spinels at a temperature below 1650° C., the practical operating temperature limit of the furnace 10 of FIG. 1.

A fourth point 72 is shown on the chart of FIG. 2, illustrating the results which are achieved when stainless steel is melted in the furnace 10 without any matrix forming soil or other materials. The stainless steel becomes a mixture of 78% $Fe_3O_4$ and 22% $Cr_2O_3$. This fourth point 72 can be seen to lie well within the undesirable spinel region of the chart. Additionally the liquidus temperature of the mixture is nearly 1900° C., a temperature that is well above the practical operating temperature of the furnace 10.

It can be seen therefore that when stainless steel is introduced into the furnace 10, there should be a substantial amount of matrix former such as silica bearing soil introduced along with the stainless steel. While it is not necessary to make soil the predominant ingredient in a furnace charge, it is desirable to assure that matrix former constitutes at least about 40% by weight of the charge.

The following practical example helps to illustrate how the principles of our invention can be applied to real-life disposal. We have found that when certain ratios of matrix formers and iron are in the slag mixture in the furnace 10, then melting and disposal of stainless steel can be expediently performed. Additionally we have found that following a particular sequence of steps is also useful in facilitating the melting and disposal of stainless steel.

A typical batch disposal would take place in the following way. A mixture of approximately 500 pounds of matrix former and 100 pounds of iron or carbon steel would be initially melted into a slag in the furnace 10. The matrix former would be soil having a silica content of 60 to 65%. After this initial mixture is molten, stainless steel would be added along with additional iron or carbon steel. The stainless steel and iron would be added together in a ratio of about 1 to 1. That is, for each pound of stainless steel added to the slag in the furnace 10, a pound of iron or carbon steel would also be added.

About 250 pounds of stainless steel can be added in this way over a period of time of about two hours. The slag mixture would then be allowed to reach an equilibrium state without any additional additions of waste material for another 20 minutes. At this point the slag can be readily poured from the furnace 10. This is accomplished simply by slowing the rotation of the chamber 22 and allowing the slag to pour into the waste containers 30.

If stainless steel is added to a molten slag without observing the precautions of adding iron or carbon steel and spreading the introduction over a reasonable time period, then the following problems occur. The stainless steel partially melts and sinks to the bottom of the molten slag. Some of the iron and chromium dissolves into the slag becoming oxides. This begins to raise the viscosity and the melting temperature. The sunken stainless steel then comes into contact with the bottom of the chamber 22 which is water cooled. The stainless steel then freezes through heat transfer to the water cooled chamber surface. The stainless steel then stays in a solid form irrespective of how much time the slag is allowed to stay in the furnace 10. The solid stainless steel in the bottom of the chamber 22 precludes effective dumping of the furnace 10. We have found that if this phenomenon occurs, then the only recourse is to stop feeding waste and start feeding iron and soil. Then slowly, over the course of many hours, we use a plasma torch to melt the solid matrix and solid stainless steel out of the chamber 22. Obviously, this is a not at all consistent with a cost-effective waste disposal operation.

All of the descriptions of the furnace operation set forth above have been made in the context that the furnace 10 is at full operating temperature before any waste material is introduced. It is also important to understand how addition of iron can be effectively made prior to the furnace being heated. Indeed it has been found highly beneficial to introduce iron in a specialized form prior to initiation of heating of the furnace 10.

The throat 26 of the furnace 10 is formed of water cooled copper. In prior art operating methods of the furnace 10, an arc from the plasma arc torch 16 was struck on the copper throat 26 since the throat 26 was typically the only electrically conductive object in the empty furnace 10. This mode of operation resulted in rapid deterioration of the copper throat 26 and thus frequent replacement of the throat 26 was required.

Figure 3:
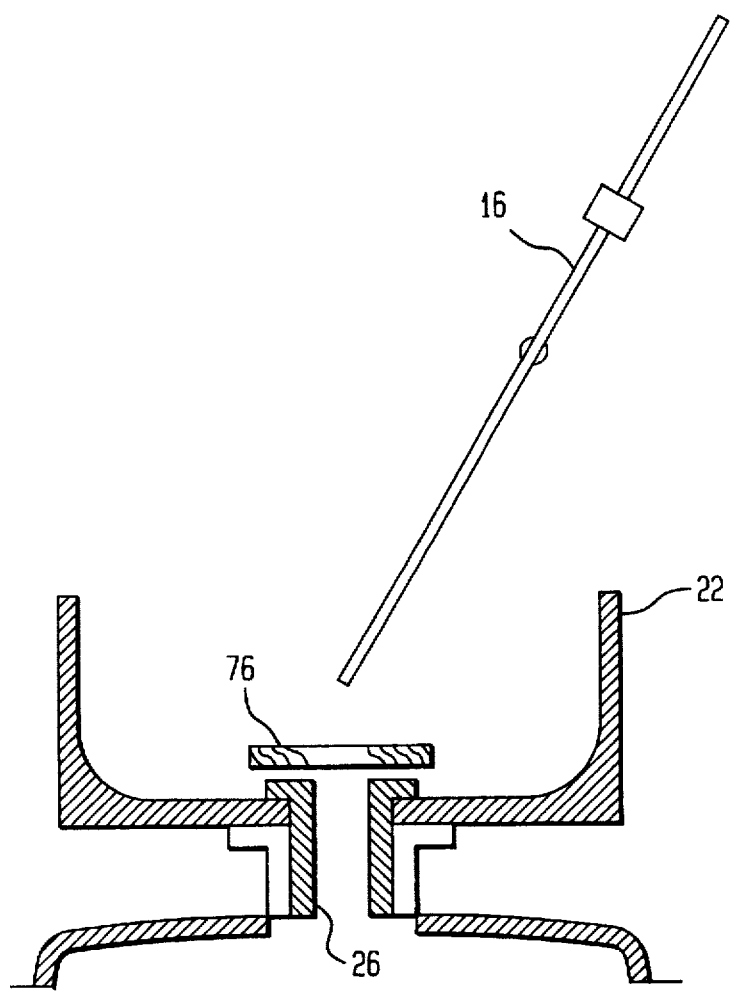
FIG. 3 shows a portion of the furnace of FIG. 1 illustrating an inventive employment of an iron ring starting device.

Referring now to FIG. 3, there is shown an iron ring 76 placed on top of the throat 26 of the furnace 10 of FIG. 1, in accordance with the present invention. The iron ring 76 has two beneficial effects. When an initial arc is struck to begin heating the furnace 10, the arc is struck between the torch 16 and the iron ring 76. This begins a melting process which melts the iron ring 76 and produces an initial heating of the furnace 10. The molten iron acts as a solvent to remelt frozen slag which is left from previous furnace operations (sometimes referred to as a "skull"). Once the skull is remelted, waste feeding can begin. Also, the iron functions in the manner described above to maintain a low viscosity in the molten mass of waste material.

Additionally, in accordance with the present invention, we have discovered that a rapid deceleration of the rotatable chamber 22 is beneficial in producing an efficient discharge of the slag through the throat 26. Typically the rotatable chamber 22 is operated with a rotational speed of 50 to 60 revolutions per minute when the volumetric capacity of the chamber 22 is reached. In the prior art, the rotatable chamber 22 was progressively slowed from its nominal operating speed of 50–60 rpm to a speed of about 18 rpm when the slag was to be poured through the throat 26. The progressive reduction of speed took place over a period of time that exceeded about two minutes. We have found that when the rotatable chamber 22 is slowed in a period of less than 30 seconds, the slag cleanly leaves the outer walls of the chamber 22 and dumps efficiently through the throat 26 into the waste container 30 positioned below it.

The above descriptions of concepts and operating examples illustrate the principles of the invention. We have also set forth below a set of practical operating parameters. It has been have found that a desirably leach resistant solidified waste is produced by the furnace 10 when it is operated within these parameters.

A. Full charge in furnace about 1200 lbs.
B. Percentage of silica matrix former about 40% or more
C. Percentage of other matrix formers about 10%
D. Weight of iron in charge about 20% to 60% of non-volatile, non-combustible materials.
E. Feed rate of waste into furnace about 350 pounds per hour
F. Time of exposure to oxygen feed time plus additional 10 to 40 minutes after feeding is completed
G. Concentration of oxygen about 18% to 50% on a mole basis It is to be appreciated and understood that the specific embodiments of the invention are merely illustrative of the general principles of the invention. Various modifications may be made by those skilled in the art which are consistent with the principles set forth. For example, a change in the amount of iron added to a charge of waste can produce a different optimum time of exposure to an oxidizing atmosphere while attaining the desired low viscosity of slag.

What is claimed is:

1. A method for operating a centrifugal plasma arc furnace wherein a molten mass of waste material is supported by centrifugal force during treatment and wherein, after treatment is completed, the molten mass is discharged from the furnace when rotational speed of the furnace is substantially reduced, which method comprises the steps of:

adding iron to a charge of waste material being treated in the furnace;

exposing the charge of waste material and the added iron to an oxidizing atmosphere while these materials are in a molten state; and controlling the time of exposure to the oxidizing atmosphere to produce iron oxides in the slag, which iron oxides are predominantly in an $Fe_3O_4$ state, whereby the molten slag is produced with a viscosity low enough to permit flow of the slag from the furnace when rotational speed of the furnace is substantially reduced.

2. The method of claim 1 wherein the mass of iron comprises at least about 20% of the mass of non-volatile, non-combustible portion of the waste material.

3. The method of claim 1 wherein a full charge of waste within the furnace is about 1200 pounds and the method comprises the further steps of:

introducing waste at a rate no higher than about 350 pounds per hour;

exposing the waste material to an oxidizing atmosphere during the time period of introducing the waste; and continuing exposure of the molten waste material for an additional period of time of at least about 10 minutes after the full charge is in the furnace.

4. The method of claim 3 wherein the oxidizing atmosphere in the furnace is comprised of at least about 18% oxygen on a mole basis.

5. The method of claim 3 wherein the additional period of time is no greater than about 40 minutes.

6. The method of claim 1 wherein iron comprises between about 20% and 60% of non-volatile and noncombustible material in the charge of waste material.

7. The method of claim 1 wherein the slag contains silica matrix former and the slag has a viscosity high enough to support newly introduced metallic waste objects until the objects are melted.

8. The method of claim 7 wherein the silica matrix former comprises at least about 40% by weight of the slag.

9. A method of treating waste material in a plasma arc furnace having a rotatable chamber which method comprises the steps of:

placing a mass of iron bearing metal into the rotatable chamber prior to introduction of any of the waste material into the chamber;

rotating the chamber;

heating the iron bearing material to a molten state with the plasma arc;

introducing the waste material into the chamber after the iron bearing material is made molten;

heating the waste material with the plasma arc to melt the waste material into a slag; and introducing oxygen into the chamber during heating of the waste material;

continuing rotation of the chamber and exposure to oxygen after the chamber has been filled to its capacity with waste material;

said continued rotation and exposure to oxygen being performed for a period of time suitable to produce iron oxides in the slag which iron oxides are predominantly in a magnetite state, whereby the slag is mixed to a desirably homogenous condition while retaining a relatively low viscosity that facilitates its removal from the chamber; and discharging the iron bearing, molten slag from the chamber.

10. The method of claim 9 wherein the iron is introduced in the form of a ring which surrounds a throat of the furnace.

11. The method of claim 9 wherein said continued rotation and exposure to oxygen is performed for a period of at least about 10 minutes and no longer than about 40 minutes.

* * * * *